United States Patent [19]
Biss et al.

[11] Patent Number: 6,016,135
[45] Date of Patent: Jan. 18, 2000

[54] BAR CODE READING INSTRUMENT AND SELECTIVELY ORIENTABLE GRAPHICS DISPLAY WHICH FACILITATES THE OPERATION OF THE INSTRUMENT

[76] Inventors: Charles E. Biss, 4134 Prospect St., P.O. Box 232, Williamson, N.Y. 14589-0232; Andrew Longacre, Jr., 21 Leitch St., Skaneateles, N.Y. 13153; L. Michael Hone, 1224 Stockbridge Rd., Webster, N.Y. 14580

[21] Appl. No.: 08/046,512

[22] Filed: Apr. 12, 1993

Related U.S. Application Data

[63] Continuation of application No. 07/773,488, Oct. 9, 1991, abandoned.

[51] Int. Cl.[7] .......................................... G09G 5/34
[52] U.S. Cl. .............................. 345/126; 345/179
[58] Field of Search ..................... 340/707, 706, 340/825.35; 235/462, 465, 467, 472; 345/156, 179, 157, 182, 183, 121, 126, 116

[56] References Cited

U.S. PATENT DOCUMENTS

| | | | |
|---|---|---|---|
| 4,251,798 | 2/1981 | Swartz et al. . | |
| 4,360,798 | 11/1982 | Swartz et al. . | |
| 4,902,883 | 2/1990 | Poland | 235/462 |
| 5,023,438 | 6/1991 | Wakatsuki et al. | 340/711 |
| 5,107,100 | 4/1992 | Shepard et al. | 235/462 |

OTHER PUBLICATIONS

Bar Code Print Quality Guidline, American National Standards Institute, 1990.

*Primary Examiner*—Chanh Nguyen
*Attorney, Agent, or Firm*—Lyon & Lyon LLP

[57] ABSTRACT

A hand-held instrument for reading a bar code symbol obtains print quality parameters by analyzing a signal resulting from code reading, using an internal computer having memory contained in the instrument. The instrument includes a graphic display comprising a display device such as a liquid crystal having a matrix of elements arranged in areas which provide a message containing a plurality of dot matrix characters, other areas where the elements are formed into segments for display of alphanumeric characters and still other areas where the elements are formed into legends. The computer has memory for storing fixed or variable text messages which are selectively displayed depending upon the results of the print quality analysis. The display is selectively orientable (flippable) to present messages in the message area, characters in the segment area and graphics in other areas in upright position and in proper orientation for readability by use of the controls to set the display to present the messages either in left or right-handed orientation. The instrument can be handled in either the right or left hand and the display presented in readable position. The areas are arranged so as to be mirror-wise symmetric about a longitudinal axis through the instrument so that when the computer writes data into the array of the graphic driver, it is written in an orientation and ordered so that the display presents the graphics upright and in order (left to right in the American system) for viewing.

4 Claims, 5 Drawing Sheets

-- LEGEND --

S - SEGMENT WITHIN 7-SEGMENT ARRAYS

W - LEGENDS ERECT

M - LEGENDS INVERTED

< - BARGROWTH ARROWS

□ - 5 X 7 CHARACTER DOT ARRAYS FOR DATA & MESSAGES

* - REPRESENTATIVELY DARKENED DOTS

BAR CODE READING INSTRUMENT AND SELECTIVELY ORIENTABLE GRAPHICS DISPLAY WHICH FACILITATES THE OPERATION OF THE INSTRUMENT

This is a continuation of application Ser. No. 07/773,488, filed Oct. 9, 1991, now abandoned.

This application is related to U.S. patent application Ser. No. 07/706,520 filed May 23, 1991 in the name of C. S. Whitaker which is assigned to the same assignee as this application and which is for the ornamental design of a bar code reading instrument which can analyze bar code print quality and has a display area in which the parameters of the code and other information with respect thereto can be presented.

DESCRIPTION

The present invention relates to a system for graphics display in which the display is presented in selected orientations and a hand-held device on which the display is mounted, the use of which device in either the left or right hand is facilitated by the selectively orientable display.

The invention is especially suitable for use in a hand-held instrument for analyzing the print quality of bar code symbols, and provides an instrument for such purpose adapted to be held in one hand while carrying out all functions of reading, analysis and display of the procedures for carrying out the analysis and the results thereof. The use of the instrument is facilitated by the selectively orientable (flippable) graphics display which presents a menu of instructions useful in operating the instrument to analyze bar codes and for presenting the results of the analysis.

Bar code print quality determines whether a printed bar code symbol is decodable reliably and consistently. The American National Standards Institute has developed quality parameters for printed bar code symbols. These parameters and algorithms and flow charts for the computerized measurement thereof from the analog signal resulting from scanning of a printed bar code symbol are set forth in American National Standard, ANSI X3.182-1990 which is published by the American Nationals Standards Institute, 1430 Broadway, New York, N.Y. 10018 U.S.A. The Standard also defines bar code symbologies, and the symbology used determines whether the print quality of the code is acceptable. An instrument for measurement of bar code print quality which has been available is the "Quick Check" which is sold by Photographic Sciences Corporation, 770 Basket Road, Webster, N.Y. 14580 U.S.A. Other earlier attempts to provide instruments for print quality measurement are the subject matter of U.S. Pat. Nos. 4,521,798 and 4,360,798.

These prior instruments are difficult to operate when hand held and are usually held in a stand. The instruments include includes a bar code scanner, a computer programmed to decode the bar code signal from the scanner and to analyze it for the various parameters indicating its print quality and a display, all contained in a housing. In the Quick Check instrument which has been heretofore available and for other print quality measurement instruments which are known, such as those mentioned in the above-referenced patents, the housing is sufficiently large to carry a graphics display across the width thereof. This display must be sufficiently large to carry messages about the codes being scanned, the parameters being analyzed and the value of those parameters. It is also desirable to quickly display words indicating that the print quality has failed readability specifications, as well as information as to print quality trends such as whether the bars of the code are spreading or shrinking with respect to the standard code widths. A quick display of a print contrast signal (PCS) and the alphabetic code grade is also desirable.

To present all of this information on a miniaturized instrument which is adapted to be hand held, much like a pen, because of the multiplicity of types of information, messages, scales, key words and graphics necessitates that the display extend longitudinally of the instrument. This then exacerbates the problem because the instrument may be hand held either in the left hand or the right hand of an operator. Conventional display technology utilizes a so-called character ROM in a display driver to turn on and off every element of the display. Such conventional character ROM drivers are capable of operating the elements so as to present messages and graphics in only one orientation. This orientation may be suitable and readable when the instrument is carried in one hand or the display is across the width of its housing. However, if shifted to the other hand, the display is flipped upside down. The display is then not readable during operation of the instrument. The instrument must be manually flipped over in order to orient the display for reading. It is desirable to provide an instrument which has a bar code scanner at one end thereof which is swept across the bar code to scan the code. Then the display is not legible (because flipped upside down) when the instrument is used to scan the code and held in the wrong hand.

Accordingly, it is an object of the present invention to provide an improved graphics display capable of displaying a multiplicity of different types of information such as different text messages, scales, key words and characters such as represent bar code print quality and instructions for making print quality measurements, which presents graphic information selectively in different orientations.

It is another object of the present invention to provide an improved graphics display usable in a device, such as an analyzing instrument, which is adapted to be hand held and enables the miniaturization thereof by providing for selective orientation of the graphics presented by the display so as to be readable with the characters in upright position and in sequence in accordance with the rules of the English or other languages in which the information is presented with the device held either in the right hand or in the left hand.

It is a still further object of the present invention to provide an improved computer-driven graphics display system wherein the graphics are orientable selectively so as to be mirror-wise symmetric and fully legible (oriented in the same direction and with characters in the same sequence) when the display has different orientations (i.e. when it is flipped over).

It is a still further object of the present invention to provide an improved computer-driven display, such as an LCD (liquid crystal display) which is flippable to present messages, values in letters and numbers and legends (whole words or symbols) either in left- or right-handed orientation.

It is a still further object of the present invention to provide a bar code print contrast scanning and analyzing instrument with an improved flippable graphics display which presents a multiplicity of different measurements or results of computations on such measurements and messages containing a menu providing instructions for the operation of the instrument.

It is a still further object of the invention to provide an improved instrument for the reading of bar codes, the analysis or verification of the print quality of the codes so read, and the display of information concerning the analysis and the results thereof which is adapted to be held in one hand and operated to perform its reading, analysis and display functions. It is a more general object to provide an improved bar code reading instrument.

Briefly described, a graphic display system embodying the invention, which is useful in a bar code print quality measuring instrument, includes a display, such as an LCD display, having a matrix of elements switchable between light and dark states, from which elements images of characters, words or the segments of characters may be formed. Data signals are generated, suitably in a computer which has as its inputs bar code signals which are derived from a bar code reader (also referred to as a scanner), representing the characters or legends or other information (e.g., values along a scale) to be displayed. A graphics driver is operated by these data signals and selectably changes the elements of the display between their light and dark states for presenting the characters selectively in upright and inverted orientation and in reverse sequence when inverted than when upright, such that a message containing the characters can be presented in right-handed or left-handed orientations. The display when embodied in the instrument facilitates the operation of the instrument by allowing it to be held in the right hand or in the left hand of the operator using the instrument and to perform its functions while held in one hand.

The foregoing and other objects, features and advantages of the invention, and a presently preferred embodiment thereof, will become more apparent from a reading of the following description in connection with the accompanying drawings in which:

FIGS. 1A and B are perspective views showing a bar code print quality analyzing instrument embodying the invention held in the right hand and left hand of the operator, respectively;

Figure 1A:
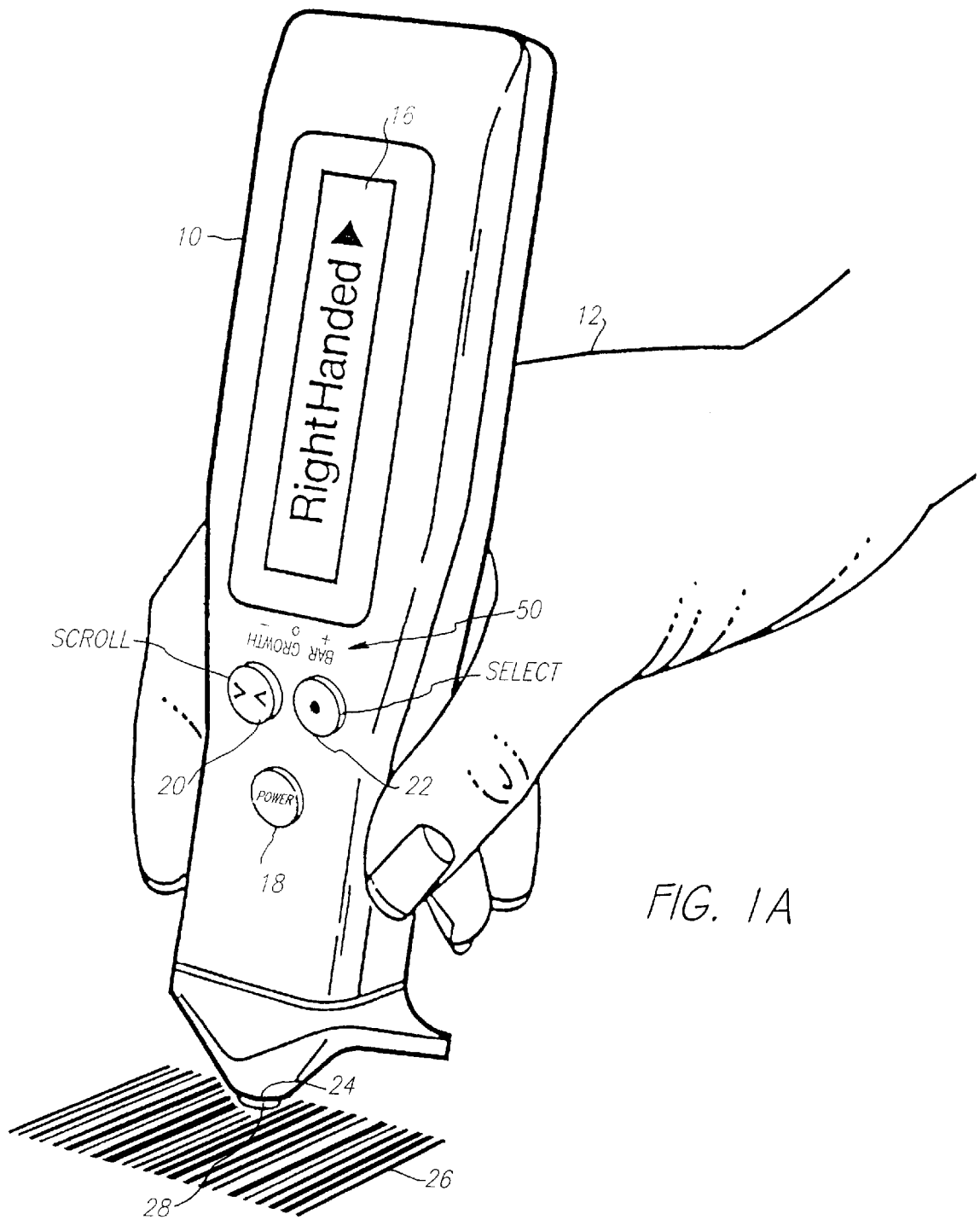
Figure 1B:
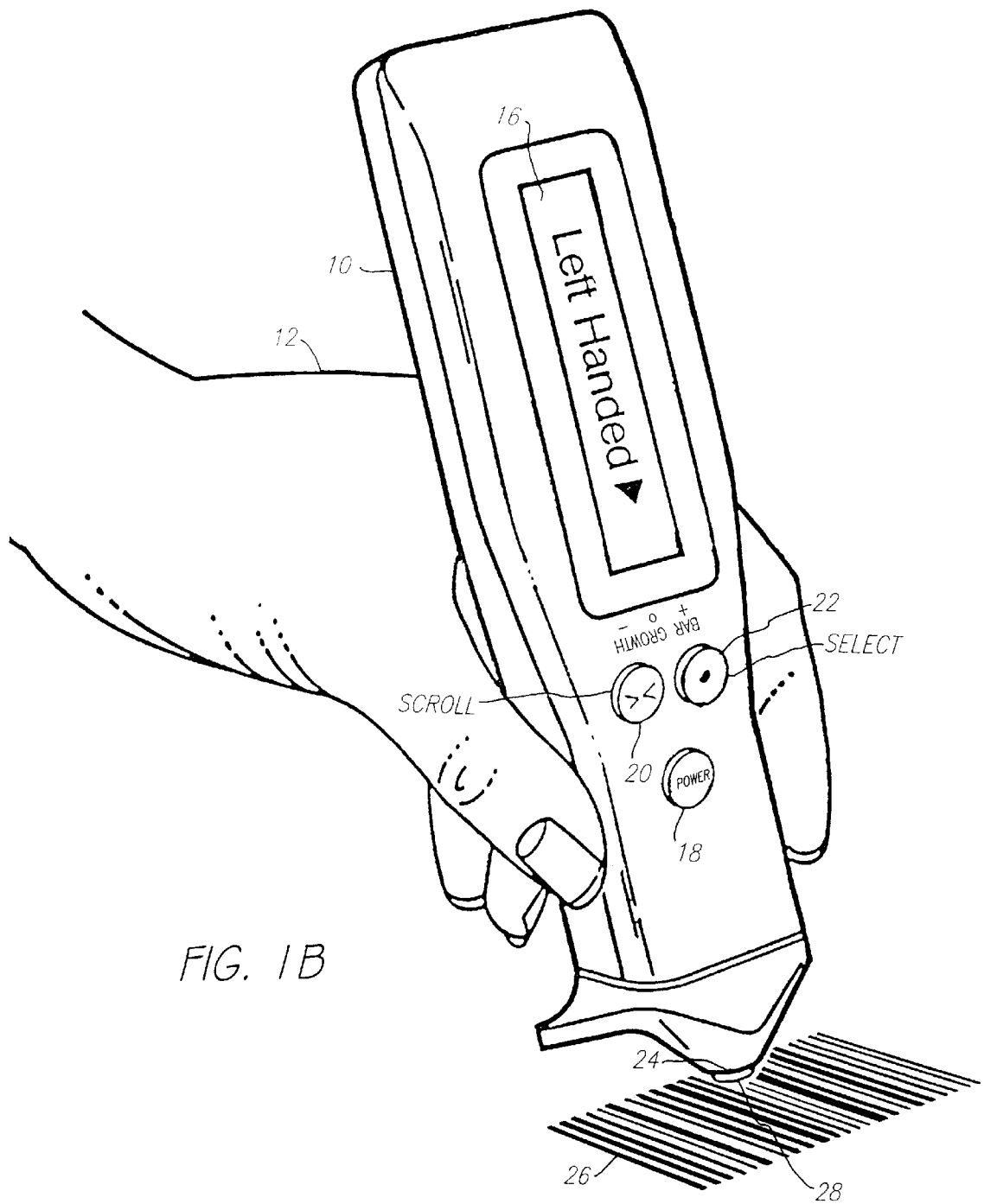
Figure 2:
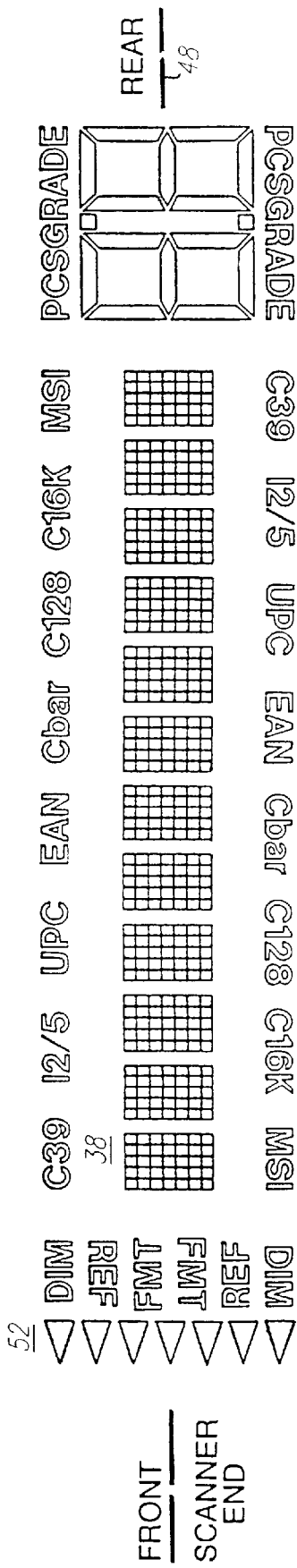
FIG. 2 is a layout of the display used in the instrument shown in FIGS. 1A and B.

Referring to FIGS. 1A and 1B there is shown a bar code print quality measurement and analyzing instrument 10 held in the right hand 12 of the operator in FIG. 1A and the left hand 14 of the operator in FIG. 1B. The instrument is portable (having a self-contained battery) and miniaturized. It may, for example, be 7.15 inches long, 1.8 inches wide at its maximum width and 1.2 inches high between its bottom surface and top surface, where there are located an LCD display 16 and three push buttons. These are a power button 18 to turn the instrument on and off, a scroll button 20 which scrolls or steps the instrument through different items in a menu to display different messages to prompt the operator to display parameters corresponding to these messages when the operator presses a select push button 22.

The instrument includes a bar code scanner 24 at the lower end thereof shown scanning a typical bar code 26. The reader may be of a design which is conventional and having a light source and a photodetector. The light source directs a beam onto the code through an aperture at the lower end 28 of the scanner. The photodetector responds to light from the code and provides an analog signal which is conditioned in the scanner and applied to a central processing unit for reading the code (decoding it) and analyzing it for the type (symbology) of code and for print quality parameters. The scanner 24 and the CPU 30 are shown in FIG. 3.

Figure 3:
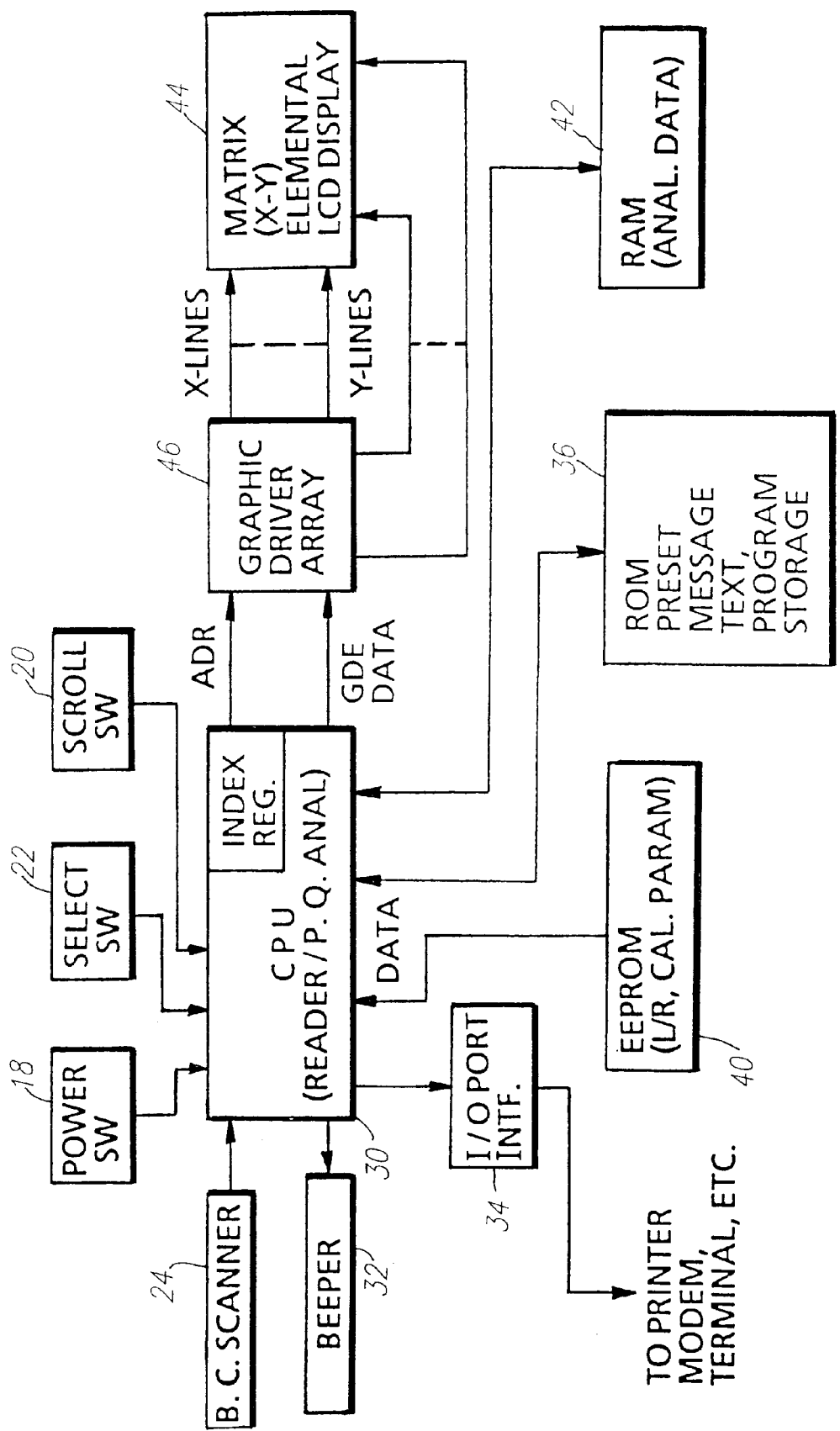
FIG. 3 is a block diagram of the instrument and the display.

Also as shown in FIG. 3 the CPU has input ports which provide electrical signal levels indicating the actuation of the power switch 18, the scroll switch 20 and the select switch 22. Output ports from the CPU are connected to a beeper 32 internal of the instrument 10 which provides a beep or beeps of different pitch or tonal combinations to indicate that a code has been scanned or not properly scanned and that print quality analysis computations have been completed. Another I/O port circuit 34 enables data as to the type of code scanned and also the various print quality parameters to pass to a peripheral device such as a printer, modem, terminal, etc. The codes and parameters are defined in the above-mentioned ANSI standard.

The instrument also has the capability of providing "go-no go" results as to groups of parameters when the code is outside of the range of acceptable print quality. These parameters are indicated on the instrument by the display of character combinations representing legends denoting these types of print quality defects. They are dimensional defects such as bar width and decodability which have to do with the dimensions of the bars and spaces of the code, format-type errors which deal with the length of the code, the number of characters and the validity of the code in accordance with check characters and/or application standards for certain character locations which are peculiar to different industries, for example, the automobile industry and the health care industry. These standards specify that certain bar patterns or characters in certain positions represent certain values. Another group of errors are related to the reflectance of the code, both of the background and of the bars. The dimension errors are labelled "DIM." The format errors are labelled "FMT" and the reflectance errors are labelled "REF."

It is also desirable to display the print contrast signal (PCS) which is analyzed in terms of the ratio of the background to dark bar reflectances and is a numerical value. There is also a grade, expressed in letters A to F, which is a value related to decodability and other quality parameters. For further information with respect to these parameters reference may be had to the above-mentioned American National Standards Institute document.

It is also desirable to provide a quick measure of the tendency of codes to deviate from standard print quality. The average bar growth or shrinkage with respect to a standard width is a preferred measure. This shows a deviation from nominal in a code before it leaves (by virtue of insufficient inking or excess inking which causes bar spreading) the range of specifications for decodability or dimensional tolerances.

The display of all of these parameters requires a multiplicity of items of information. The system provided by the invention, and particularly the display system, enables all of the information to be displayed in upright position with the letters in normal sequence (e.g., left to right in English and right to left in Japanese, Hebrew, Arabic, etc.) so as to permit the display to be read while the instrument is in use either in the right hand as shown in FIG. 1A or in the left hand as shown in FIG. 1B.

Returning to FIG. 3 a read-only memory (ROM) 36 stores, in different locations, pre-set messages which are displayed in a message field 38 of the display. Such messages include texts which indicate that the display is set for right-handed operation (see FIG. 1A) or left-handed operation (see FIG. 1B). The program which the CPU executes is also stored in ROM 36. There is a non-volatile memory, such as an electrically erasable programmable read-only memory (EEPROM) 40 which contains a left/right flag (L/R) which is set in operating the instrument to flip the display either for left-handed or right-handed operation. Also set in the memory 40 are calibration parameters such as for the various industry standards. The results of the measurements including the calculated parameters are stored in random access memory (RAM) 42. These memories are addressed by an index register on the CPU chip 30 so that messages stored in different locations can be selectively accessed. Access is by operating the scroll and select switches 20 and 22 to display the preset messages in order. These messages define a menu. The first message at the top of the menu when power is applied (power up) may identify the instrument and the aperture of the scanner 24. For example, this start message may read "QC-200 06/660 nm" meaning that the aperture of the scanner 24 is 6 mils and the wavelength of the illuminating light is 660 nanometers.

Figure 4:
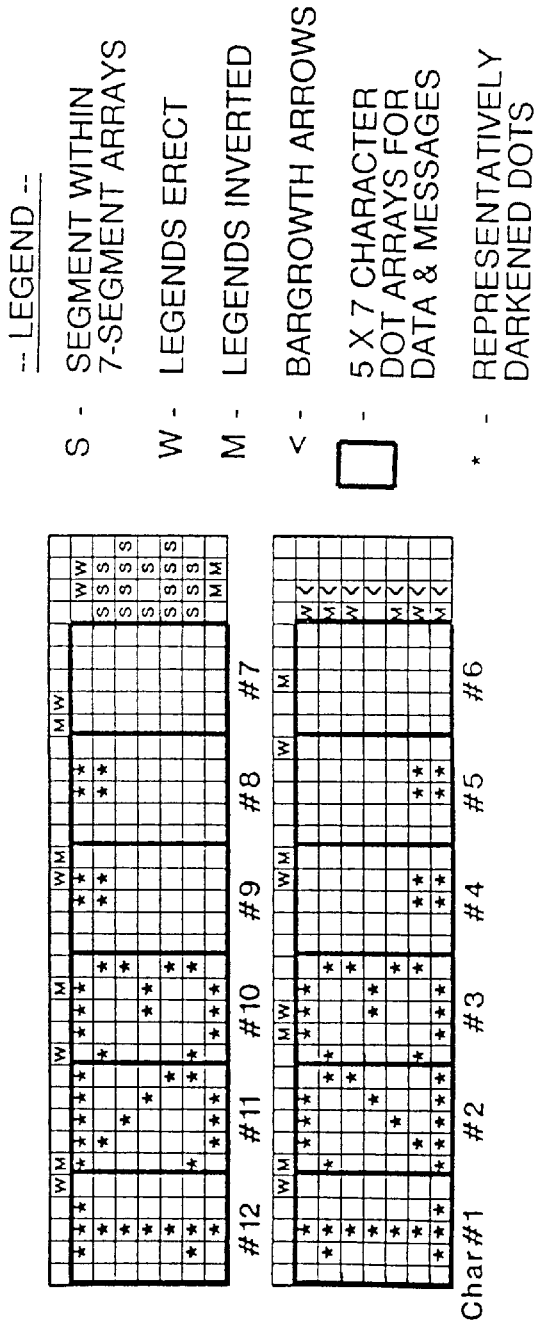
FIG. 4 is a map of the storage elements of the graphic driver array shown in FIG. 3.

The display is an (x-y) matrix of liquid crystal areas which can be light (reflective) or dark (non-reflective). The elements are defined by electrodes in accordance with conventional and well-known LCD technology. The display matrix is indicated at 44 in FIG. 3. The display matrix is driven by a graphics driver chip which has an array of storage cells. In this embodiment the array is 16 cells in the y direction and 34 cells in the x direction. The x direction is the longitudinal direction along the length of the instrument 10. The graphic driver chip layout is illustrated in FIG. 4. The cells are connected by 16 y and 34 x lines, which for a cell which is set (high), operates an element in the display matrix 44. The driver 46 may be a commercially available integrated circuit chip. It has been found that a chip manufactured by S-MOS Systems of San Jose, Calif., USA, their type SED1502 being suitable. This chip is addressed on address lines (ADR) from the CPU and the display element data (GDE) is applied to the addressed area.

Returning to FIG. 4 the display matrix 44 is shown as having a message field for 12 characters made up of 5×7 dot matrices. There are fields for the legends in upright (left to right) or inverted (right to left) sequence. A row of legends identifies the code symbology, from code 39 (C39) through the MSI code. The error groups DIM, FMT and REF are represented by legends of combinations of characters. Each constitutes a single element of the display. There are legends for PCS and GRADE, again in upright and inverted orientation. There is a field for a seven-segment two-character display to indicate the alphanumeric value of PCS or GRADE. Another field of arrow heads defines the growth/shrinkage scale. This scale is also printed at 50 on the instrument 10, as the bar growth scale. Growth (plus) and shrinkage (minus) is indicated. One of the arrows 52 of the scale will be darkened to indicate whether or not the bars are growing or shrinking with respect to the standard width for the symbology in line.

The entire display is mirror-wise symmetric about a longitudinal axis 48 which extends through the center of the display. The legend fields for the combination of characters are in rows and columns spaced symmetrically with respect to the axis 48. The axis 48 also extends through the center segment of the alphanumeric display between PCS grade legends. Accordingly, if the display is flipped to make it readily legible for either right-hand or left-hand operation, such flipping is about the axis 48 and causes no change in the display even though the orientation thereof is changed.

The array layout, as shown in FIG. 4, has 12 character spaces for the message field, spaces for the segments of the seven-segment arrays, spaces for the legends in erect and upside down orientation and spaces for the bar growth arrows 52. The characters for right to left sequence are stored in cells in the 5×7 matrices for each of the twelve characters in the message field in character sequence order and in upright position. This is shown in character matrices for characters #1, #2, and #3 by way of example. When the display is flipped the cells are written into in inverted order and in reverse sequence. The first character (numeral 1 in the example shown in FIG. 4) is then in the twelfth 5×7 matrix and in inverted position. Similarly, the characters "2" and "3" are in the eleventh and tenth position (reverse sequence) and also in inverted position.

Figure 5:
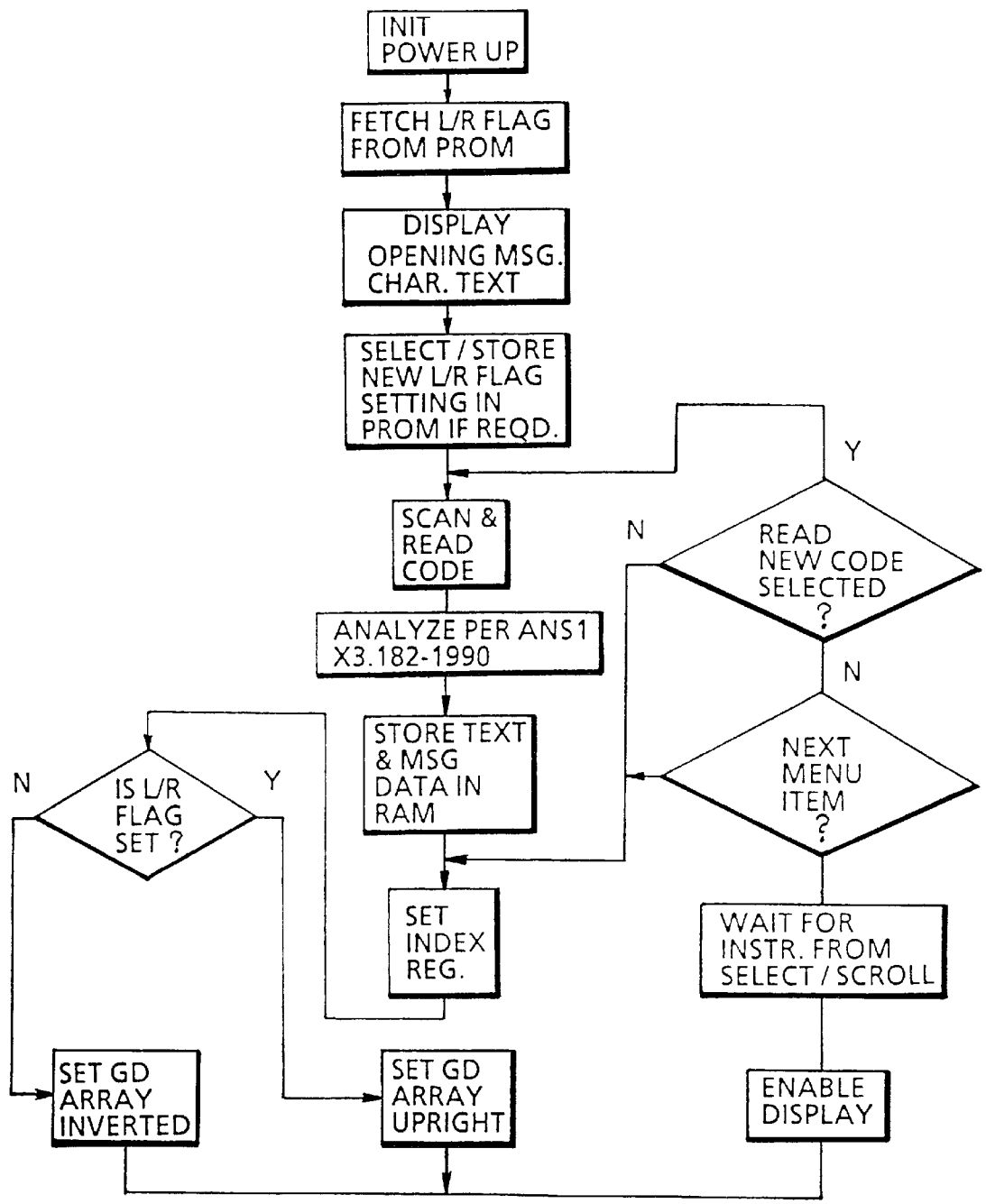
FIG. 5 is a flow chart illustrating the programming of the CPU (Central Processing Unit or computer) of the system shown in FIG. 3 to operate the display.

The display program in ROM of the CPU is called on initialization (power up) as shown in FIG. 5. The first index register address is to the opening message in ROM and the opening message is displayed. If the display is correct, nothing further need be done. However, if the display is inverted, the L/R flag is set in the RAM 42 with an image thereof stored in the PROM 40. This is done by scrolling to an "L/R set" instruction message and then pressing the select switch. The selection is then stored non-volatively in EEPROM 40. On initialization the flag is set in RAM. Menuing (upon scrolling) can alter the flag (for a temporary change thereof). Menuing can also update the image (stored change in the PROM), which then affects the display orientation upon the next power up (initialization). The message to scan and read the code then appears. The system then analyzes the code per the ANSI standard or traditional measurement protocols and the results of the measurement are stored in different message data locations in RAM 42. The messages to the various legends are automatically addressed via the index register and displayed in upright position. Then the scroll switch can scroll to the desired parameter or PCS or grade field indications. Also the index register address points to the messages in ROM parameters which result in the dimensional, format or reflectance-out-of-specification condition and sets these legends as appropriate for an out of specification print quality condition. Then the menu can be scrolled to an instruction for an appropriate parameter in the dimensional, format or reflectance categories and the various parameters thereof displayed.

The display is written to after first examining the L/R flag. If the flag is set in one state for inverted display, the program reads the message from the memories in the text field and other fields of the graphics driver array in the upright position and in left to right sequence. Alternatively, if the array is set inverted, the text messages are read out to the driver array in reverse order (in text character position 12, then in position 11 and then in the remaining positions in the reverse order). The display is then enabled and data from the driver array 46 is transferred to the LCD display where it is displayed in upright position and left to right or right to left sequence. The various messages are displayed in accordance with instructions from the scroll and select switch buttons 20 and 22 and which step to successive messages in the menu. When a menu item instructs the operator to scan a new code, the program jumps back to the scan and read code process.

From the foregoing description it will be apparent that there has been provided an improved bar code print quality measurement instrument and an improved display especially suitable for use therein. Variations and modifications in the herein described display and instrument, within the scope of the invention, will undoubtedly suggest themselves to those skilled in the art. Accordingly, the foregoing description should be taken as illustrative and not in a limiting sense.

We claim:

1. A graphic display system comprising:
   (a) display means having a matrix of elements switchable between light and dark states from which elements images of characters are formed, said matrix of elements being disposed about a longitudinal axis and said display means having rotation symmetric about said axis;
   (b) means for generating data signals representing said characters, said generating means including a memory having storage for said data signals;
   (c) graphic driver means operated by said data signals for selectively changing the elements of said display means between said light and dark states for presenting said characters selectively in upright or inverted orientation and in reverse sequence when inverted, such that a message containing said characters can be presented in right- or left-handed orientations and in upright or inverted orientation, said driver means being operative to present said characters in the same orientation and sequence when said characters are flipped in opposite directions to positions 180° displaced from each other symmetrically about said axis, wherein said driver means comprises means for converting said data signals corresponding to said characters to light and dark states of said elements to form said characters in said matrix, and said converting means comprises means providing an array of data signal storage cells corresponding to said matrix of elements;
   (d) means for reading said data signals from said memory into said array of storage cells for storing said data signals for said characters in the upright position or in the inverted position in reverse sequence; and
   (e) means for mapping said data signals in said cells to the matrix of elements of said display means in locations corresponding to the orientation and sequence of said characters in said array of data storage cells;
   wherein said elements are disposed in first and second pluralities of areas in first and second rows between which said axis extends such that said rows are on opposite sides of said axis and other graphic symbols are disposed in third and fourth pluralities of areas in rows spaced on opposite sides of said axis, said first and third pluralities of areas being disposed in mirror-wise symmetric relationship with said second and fourth pluralities of areas with respect to said axis.

2. An instrument for measuring the print quality of bar code symbols and displaying message parameters defining said print quality and the values of these parameters which comprises means for scanning a bar code to provide a bar code signal, means including a computer for reading said bar code signal and analyzing said signal to provide digital signals representing the values of said parameters, said computer means having memory means for storing text messages identifying said parameters and messages corresponding to said values thereof, a display carried on said instrument for presenting said messages, said instrument being hand holdable in either the left or right hand such that the orientation of said messages is presentable in upright or inverted position depending upon whether said instrument is in the right or left hand, said display having a matrix of elements switchable between light an dark states from which elements images of the characters representing said parameters and values thereof are formable, means operated by said computer for generating data signals representing said characters and storing said messages in different locations therein, graphic driver means operated by said data signals for selectively changing the elements of said display between said light and dark states for presenting said characters selectively in upright and inverted orientation and in reverse sequence when inverted from the sequence thereof when upright such that said message are presented in right-handed orientation when said instrument is held in the right hand and inverted and in opposite sequence when said instrument is held in the left hand, said driver means including means for reading signals from said memory thereby storing data signals from said messages obtained from said memory in the upright position or in the inverted position in reverse sequence, said elements being grouped in a first plurality of areas each defining a rectilinear matrix of dots which form a sequence of alphanumeric characters providing said messages as to said parameters and the values thereof, and said elements are also grouped in second and third pluralities of areas each presenting a separate combination of characters defining different bar code symbologies, different bar code parameters and different types of print quality parameters, selected from the group consisting of dimensional parameters, reflectance parameters, and format parameters, said first plurality being upright and ordered in one of said right- and left-handed sequences and the other being inverted and in the other of said sequences, said first and second pluralities also being mirrorwise symmetric about an axis extending longitudinally in the direction in which said characters appear in sequence so as to be readable in upright and one of said sequences when said instrument is in said right hand and inverted and in the other of said sequences when said instrument is in the left hand.

3. The system according to claim 2 wherein said elements are also grouped in a third plurality of areas defining segments from which different alphanumeric characters are formable when in the same one of said dark and light states to represent parameters corresponding to one of said parameters providing the PCS of the bar code and the GRADE of said bar code on one side of a field containing said messages and said driver means includes means for selectively changing the states of said segments to form said alphanumeric characters in upright and inverted orientation and in opposite sequence depending upon whether said instrument is held in the right or left hand.

4. The system according to claim 3 wherein said elements are also grouped in a fourth plurality of areas arranged along a line defining a scale of successive values corresponding to the growth or shrinkage of the bars of said code with respect to a standard width, and said driver means includes means for changing the state of one of said scale elements to indicate the growth or shrinkage of the widths of said bars of said code.

* * * * *